Aug. 24, 1926. Re. 16,409
J. B. ROMBOUGH
MOUTH CLAMP FOR HANDLING AND ADMINISTERING MEDICINE TO ANIMALS
Original Filed July 24, 1922 2 Sheets-Sheet 1
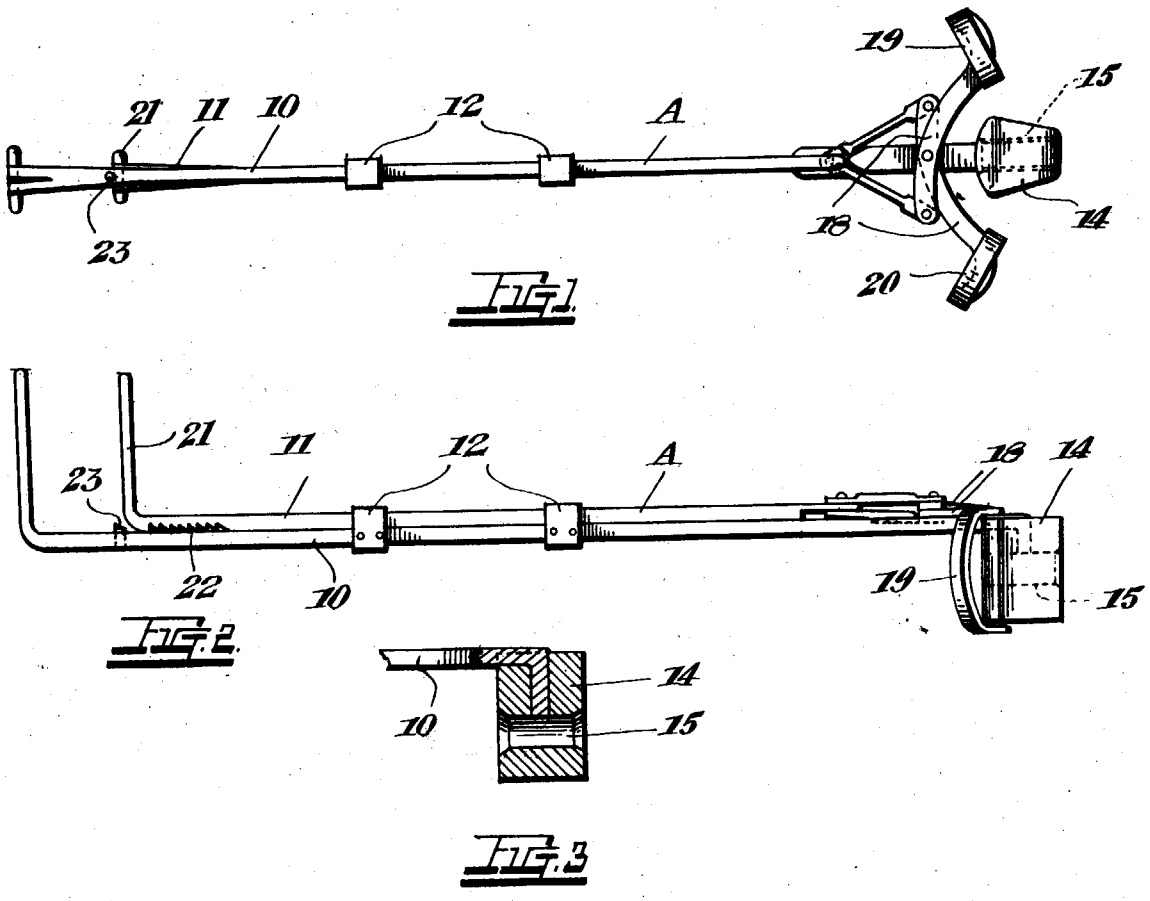
INVENTOR
JOHN B. ROMBOUGH.
BY
Dickerson & Langhorne
ATTYS.

Aug. 24, 1926. Re. 16,409
J. B. ROMBOUGH
MOUTH CLAMP FOR HANDLING AND ADMINISTERING MEDICINE TO ANIMALS
Original Filed July 24, 1922 2 Sheets-Sheet 2
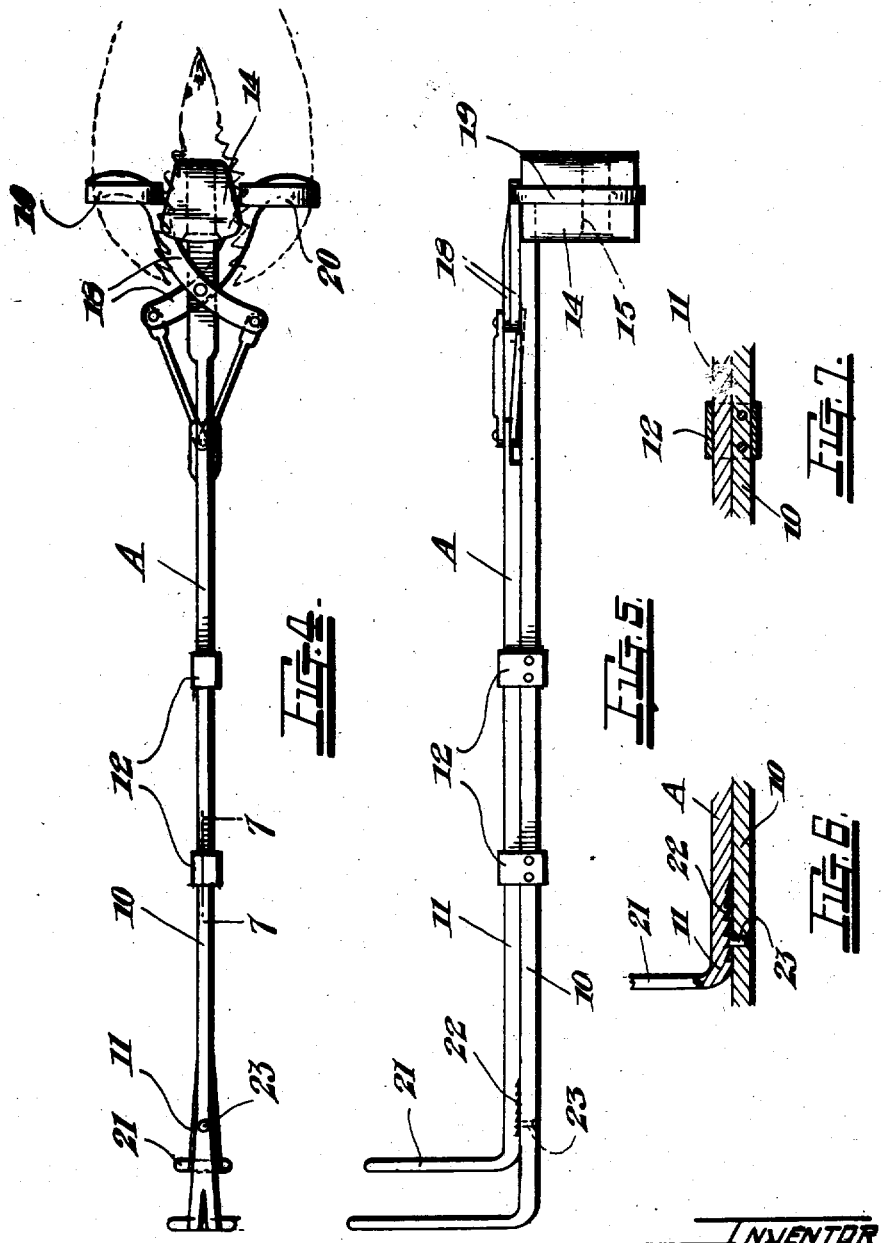
INVENTOR
JOHN B. ROMBOUGH.
BY Dettenstaedt & Co.
ATTYS.

Reissued Aug. 24, 1926. Re. 16,409

UNITED STATES PATENT OFFICE.

JOHN BARNHART BOMBOUGH, OF NIAGARA FALLS, NEW YORK.

MOUTH CLAMP FOR HANDLING AND ADMINISTERING MEDICINE TO ANIMALS.

Original No. 1,496,132, dated June 3, 1924, Serial No. 577,163, filed July 24, 1922. Application for reissue filed April 29, 1926. Serial No. 105,606.

This invention relates to improvements in mouth clamps for handling and administering medicine to animals such as foxes and other animals, and the objects of the invention are to provide a simple and efficient instrument of this kind for administering medicine to, or handling, animals without risk of being bitten to the person administering the dose and without irritating or abusing the animal receiving it.

With these and other objects in view, the invention consists essentially in the novel arrangement and combination of parts hereinafter more fully described and illustrated by the accompanying drawings.

Referring to the drawings, in which like characters of reference indicate corresponding parts in each figure:

Figure 1 is a plan view of the instrument open,

Figure 2 is a side elevation,

Figure 3 is a sectional detail.

Figure 4 is a plan view of the instrument closed.

Figure 5 is a side elevation.

Figure 6 is a sectional detail.

Figure 7 is a sectional detail on the line 7—7 of Figure 4.

In the drawings, A is the instrument as a whole comprising handle pieces 10 and 11 of suitable material and adapted in operation to slide lengthwise along each other by means of securing members or strips 12 riveted to the handle piece 10 and adapted to slidably engage the other handle piece 11. The main handle piece 10 is bent at the top and has inserted therein a gag 14 with hole 15 through which the medicine is administered, and it is also bent at the other end to form handling means.

The other or operating handle piece 11 is substantially shorter in length than the handle piece 10 and is provided at its lower end with lazy-tongs 18 pivotally mounted thereon and extending to form the clamping members 19 and 20 adapted in operation to open as shown in Figure 1, while the gag 14 is gripped by the animal about to receive the medicine, and then, on the animal gripping the gag, the clamping members 19 and 20 are closed as shown in Figure 4 to clamp the gag in the animal's mouth by engaging with the outside of the upper and lower jaws of the animal, thus holding the animal securely and enabling the medicine to be administered through the hole 15 in the gag.

This operation of opening and closing the clamps 19 and 20 is accomplished by means of the lazy-tongs operated by the handle 11 being moved downwardly and then upwardly by means of the bent handle means 21 thereon. This operating handle 11 is provided with a ratchet 22 on the inside adjacent to the top and designed to engage with a pin 23 extending through the handle 10 and, by so doing, to hold the handle 11 and the clamps 19 and 20 securely in closed position, thus locking the instrument.

When so locked, the instrument is held firmly in place and no amount of effort on the part of the animal can release it after the fangs are closed over the gag 14, and the clamping members are closed, one on the upper and the other on the lower jaw. This enables one to administer medicine through the hole in the gag and hold the animal fast for external treatment, if necessary or desired. The clamping arms may be covered with a piece of rubber tubing to prevent chafing the animal.

To unlock the instrument and release the animal, it is only necessary to spring the two handles apart about one-eighth of an inch, which allows the teeth on the ratchet side to slip past the little sharp pin 23, allowing the operating handle to slide down, opening the clamping members, as already described.

As many changes could be made in the above construction and many apparently widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:

1. In a device of the character described and in combination a supporting handle, a gag on the handle adapted to be inserted between the jaws of an animal, clamping means on the supporting member adapted to encircle both jaws of the animal, and operating means for the clamping means mounted on the handle.

2. An instrument for use with animals comprising a main handle, an operating handle movable thereon, clamping members mounted on the main handle operated by the movable handle, means on the main handle located in juxtaposition on the clamping members, whereby the said clamping members, co-operating with the said means, will securely muzzle an animal when the instrument is in use.

3. An instrument for use with animals comprising a pair of co-operating handle members, a gag carried by one of the said members, clamping jaws, lazy-tongs connecting the clamping jaws with the other handle member, said jaws being designed to encircle the jaws of an animal, as and for the purpose specified.

4. An instrument for use with animals comprising a pair of handles including a main handle and an operating sliding handle, clamping members mounted on the main handle and operable by the sliding handle, means on the main handle located in juxtaposition to the clamping members whereby the said clamping members co-operating with the said means will securely muzzle an animal when the instrument is in use.

In witness whereof I have hereunto set my hand at Niagara Falls, N. Y., this 14th day of May A. D. 1926.

JOHN BARNHART ROMBOUGH.